(12) United States Patent
Svendsen et al.

(10) Patent No.: US 10,312,594 B2
(45) Date of Patent: Jun. 4, 2019

(54) WIDE BANDED ANTENNA TUNING

(71) Applicant: Intel Corporation, Santa Clara, CA (US)

(72) Inventors: Simon Svendsen, Aalborg (DK); Ole Jagielski, Viborg (DK)

(73) Assignee: Intel Corporation, Santa Clara, CA (US)

( * ) Notice: Subject to any disclaimer, the term of this patent is extended or adjusted under 35 U.S.C. 154(b) by 57 days.

(21) Appl. No.: 15/474,199

(22) Filed: Mar. 30, 2017

(65) Prior Publication Data

US 2018/0287259 A1    Oct. 4, 2018

(51) Int. Cl.
*H01Q 5/35* (2015.01)
*H01Q 9/04* (2006.01)
(Continued)

(52) U.S. Cl.
CPC .............. *H01Q 9/0442* (2013.01); *H01Q 5/35* (2015.01); *H01Q 9/0457* (2013.01); *H01Q 9/42* (2013.01);
(Continued)

(58) Field of Classification Search
CPC .......... H01Q 5/307; H01Q 5/378; H01Q 5/10; H01Q 5/30; H01Q 5/385; H01Q 5/392;
(Continued)

(56) References Cited

U.S. PATENT DOCUMENTS

2012/0001821 A1    1/2012  Nakano et al.
2014/0015729 A1*   1/2014  Uejima ................... H01Q 9/14
                                                    343/850
(Continued)

FOREIGN PATENT DOCUMENTS

WO    WO-2018183336 A1    10/2018

OTHER PUBLICATIONS

"International Application Serial No. PCT/US2018/024581, International Search Report dated May 31, 2018", 3 pgs.
(Continued)

*Primary Examiner* — Hoang V Nguyen
(74) *Attorney, Agent, or Firm* — Schwegman Lundberg & Woessner, P.A.

(57) ABSTRACT

An antenna device, wireless communication device, and method to provide wide banded antenna tuning. The antenna device is configured to include a higher frequency range antenna element, a lower frequency range antenna element, a resonance switch, and high and lower frequency range coupler elements. The antenna device provides a high frequency switch stage and a low frequency switch stage. The high frequency switch stage includes the antenna device being configured to resonate at one or more frequencies within a high impedance bandwidth and the low frequency switch stage includes the antenna device being configured to resonate at one or more frequencies within a low impedance bandwidth. The antenna device further includes impedance tuning circuitry to modify the impedance bandwidths of both the low and high frequency bandwidths. The antenna device is configured to separately perform impedance tuning for each of a transmit signal and a receive signal.

34 Claims, 10 Drawing Sheets

(51) Int. Cl.
*H04L 5/14* (2006.01)
*H01Q 9/42* (2006.01)
*H01Q 1/48* (2006.01)
*H01Q 3/24* (2006.01)
*H01Q 1/24* (2006.01)

(52) U.S. Cl.
CPC ............ *H04L 5/14* (2013.01); *H01Q 1/24* (2013.01); *H01Q 1/48* (2013.01); *H01Q 3/24* (2013.01)

(58) Field of Classification Search
CPC ...... H01Q 1/243; H01Q 21/30; H01Q 9/0442; H01Q 9/0457; H01Q 9/42; H01Q 5/35
See application file for complete search history.

(56) References Cited

U.S. PATENT DOCUMENTS

| | | | |
|---|---|---|---|
| 2014/0253398 A1 | 9/2014 | Hsieh et al. | |
| 2014/0266968 A1 | 9/2014 | Wong et al. | |
| 2015/0002348 A1* | 1/2015 | Wong | H01Q 1/243 343/724 |
| 2015/0380818 A1* | 12/2015 | Svendsen | H01Q 5/307 343/700 MS |
| 2016/0285173 A1 | 9/2016 | Svendsen et al. | |

OTHER PUBLICATIONS

"International Application Serial No. PCT/US2018/024581, Written Opinion dated May 31, 2018", 10 pgs.

* cited by examiner

US 10,312,594 B2

WIDE BANDED ANTENNA TUNING

TECHNICAL FIELD

Some aspects relate to antennas for wireless or cellular communications. Some aspects relate to 3rd Generation Partnership Project (3GPP) Long Term Evolution (LTE) networks.

BACKGROUND

With respect to handheld wireless devices, industrial design (ID) often takes priority over antenna performance. Therefore, antenna volume is often insufficient to contemporaneously cover all desired frequency ranges for certain communication techniques. Traditionally, tunable antennas have provided a way to circumvent this insufficiency by allowing an available impedance bandwidth to be moved in frequency to cover desired frequency ranges and still obtain acceptable Over the Air (OTA) performance. However, traditional tunable antennas are typically narrow banded and will only allow coverage of a limited number of frequency bands at any given time. This is often not suitable for devices supporting communication techniques that require wide coverage of frequency bands, for example coverage of multiple non-adjacent frequency bands in Carrier Aggregation (CA) with respect to Long Term Evolution (LTE) networks.

Bandwidth enhancing techniques can increase the impedance bandwidth of an antenna, which is advantageous for devices that support communication techniques requiring a wide coverage of frequency bands. However, many bandwidth enhancing techniques have traditionally not been considered practical solutions for use in tunable antenna concepts due to various complications associated with tunable antenna concepts.

DESCRIPTION OF ASPECTS

For communication techniques that require wide coverage of frequency bands, impedance bandwidth is of major importance. However, ID concerns with respect to UE, in particular small devices such as IoT devices, typically place a priority on decreasing antenna volume, creating practical issues with respect to impedance bandwidth of UE.

These practical issues are of special concern for small devices supporting communication techniques that require wide coverage of frequency bands, for example coverage of multiple non-adjacent frequency bands in CA with respect to LTE networks. However, such practical issues are not limited to devices implementing CA, as demands in decreasing the antenna volume of UE may introduce similar problems with respect to other communication techniques.

Three types of CA are defined, including: (1) Interband CA, involving CA of component carriers in different operating bands; (2) Intraband contiguous CA, involving contiguous carriers aggregated in the same operating band; and (3) Intraband non-contiguous CA, involving non-contiguous carriers aggregated in the same operating band. Carriers aggregated in each band can be contiguous or non-contiguous, meaning that in the same band the carriers are in adjacent channels or not in adjacent channels, respectively. Because CA requires multiple bands to be covered simultaneously, traditional approaches used with narrow band antennas have not been sufficient.

To obtain a sufficient impedance bandwidth for implementing CA and other communication techniques, there is a need for antennas and tuning methods that can provide adequate bandwidth while maintaining acceptable return losses. Aspects described herein address these practical issues by providing efficient techniques that can both increase impedance bandwidth without increasing antenna volume and decrease antenna volume while maintaining impedance bandwidth. In particular, aspects described herein include both switch and tuning techniques that can be implemented in multiple stages (e.g., a lower frequency range and a higher frequency range), providing both aperture and impedance tuning.

Aspects provide advantages including reducing the number of switch stages in certain implementations, increasing available bandwidth in different tuning stages, reducing the required volume needed for tuned antennas, allowing for the application of a bias voltage without increasing a Q of an antenna, and reducing the return loss and radio frequency (RF) voltage requirements with respect to matching circuitry. Further, aspects described herein may be implemented in communication systems utilizing both duplex and half-duplex communication methods.

Figure 1:
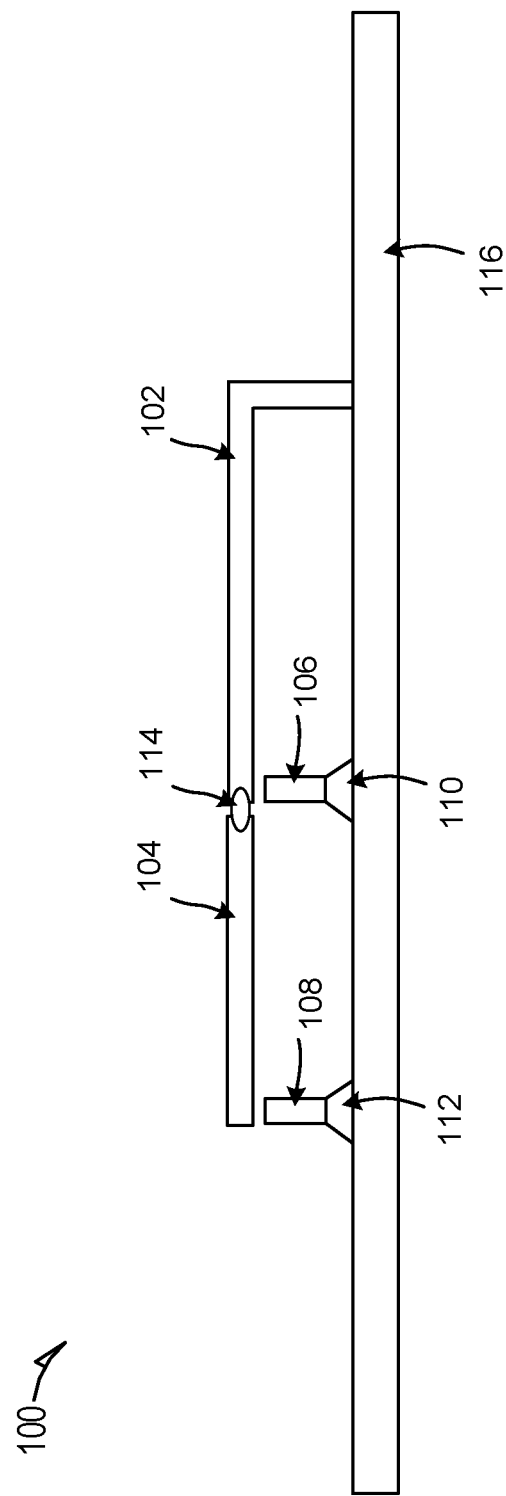
FIG. 1 illustrates a block diagram of an exemplary antenna device, according to some aspects.

FIG. 1 illustrates a block diagram of an exemplary antenna device 100, according to some aspects. The antenna device 100 comprises a first antenna element (e.g., higher frequency range antenna element) 102, a second antenna element (e.g., lower frequency range antenna element) 104, a first coupler element (e.g., higher frequency range coupler element) 106, a second coupler element (e.g., lower frequency range coupler element) 108, a first antenna feed (e.g., higher frequency range antenna feed) 110, a second antenna feed (e.g., lower frequency range antenna feed) 112, a resonance switch 114 (e.g., single pole single throw SPST switch), and biasing circuitry (not shown) configured to provide a bias voltage to the resonance switch 114. The antenna device 100 may be implemented on a surface such as a printed circuit board (PCB).

In some aspects, the higher frequency range antenna element 102 is directly coupled to a ground plane. Alternatively, the higher frequency range antenna element 102 can be coupled to the ground plane by an inductor or capacitor to ground. The lower frequency range antenna element 104 is disposed in the proximity of the higher frequency range antenna element 102, and is configured to couple to the higher frequency range antenna element 102. In some aspects, the lower frequency range antenna element 104 can be coupled to the higher frequency range antenna element 102 via the resonance switch 114, which is disposed in proximity to both the higher frequency range antenna element 102 and the lower frequency range antenna element 104 (e.g., disposed in between).

In certain aspects, the antenna device 100 further comprises biasing circuitry (not shown) that is configured to provide a bias voltage to the resonance switch 114. The biasing circuitry, for example, may include one or more resistors disposed in proximity of the resonance switch 114 (e.g., between the higher frequency range coupler element 106 and the lower frequency range antenna element 104 or between the lower frequency range coupler element 108 and the lower frequency range antenna element 104). In some aspects, DC signal routing (e.g., in proximity to the higher frequency range antenna element 102) can provide a bias voltage to the resonance switch 114, for example, in a multilayer PCB configuration. However, aspects are not so limited and the bias voltage may be provided to the resonance switch 114 via circuitry that is disposed in proximity to or integrated within other components of the antenna device 100. Further, the bias for the resonance switch 114, in certain aspects, can be implemented by using a DC connection on the higher frequency range antenna element 102, for ground, and bias voltage can be applied via either the higher frequency range coupling element 106 or the lower frequency range coupling element 108. Additionally, in some aspects, the bias for the resonance switch 114 can be implemented without increasing a Q of the antenna device 100.

Further, in some aspects, the higher frequency range coupler element 106 is disposed in proximity of the higher frequency range antenna element 102 and is configured to be capacitively or inductively coupled to the higher frequency range antenna element 102, for receiving or transmitting RF signals through the higher frequency range antenna element 102. In some aspects, the lower frequency range coupler element 108 is disposed in proximity of the lower frequency range antenna element 104 and is configured to be capacitively or inductively coupled to the lower frequency range antenna element 104, for receiving or transmitting RF signals through the higher frequency range antenna element 102 and the lower frequency range antenna element 104. In some aspects, when the higher frequency range antenna element 102 is coupled to the lower frequency range antenna element 104 (e.g., via the resonance switch 114), the electrical length of the antenna device 100 is larger in comparison to the electrical length of the antenna device 100 when the higher frequency range antenna element 102 is decoupled from the lower frequency range antenna element 104.

Therefore, in certain aspects, when the higher frequency range antenna element 102 and the lower frequency range antenna element 104 are coupled, the antenna device 100 is configured to provide a lower frequency range switch stage (e.g., a lower frequency range). A lower frequency range switch stage may include, for example, the antenna device 100 being configured to transmit or receive RF signals in a lower frequency range (e.g., the cellular low band frequencies or only a lower frequency portion of the cellular low band frequencies or only a lower frequency portion of the cellular high band frequencies). Accordingly, in some aspects, when the higher frequency range antenna element 102 is coupled to the lower frequency range antenna element 104 (e.g., via the resonance switch 114 being engaged), and the lower frequency range coupler element 108 is capacitively or inductively coupled to the lower frequency range antenna element 104, the antenna device 100 is configured to transmit or receive RF signals through both the higher frequency range antenna element 102 and the lower frequency range antenna element 104 (e.g., as a single antenna element), thereby allowing the antenna device 100 to operate within a specific lower frequency range (e.g., frequency bandwidth for cellular low band or a lower frequency portion of cellular low band or a lower frequency portion of cellular high band). By engaging the resonance switch 114, in certain aspects, to couple the higher frequency range antenna element 102 and the lower frequency range antenna element 104, the electrical length of the antenna device 100 is increased.

Likewise, in some aspects, when the higher frequency range antenna element 102 and the lower frequency range antenna element 104 are decoupled from one another, the antenna device 100 is configured to provide a higher frequency range switch stage (e.g., a higher frequency range). A higher frequency range switch stage may include, for example, the antenna device 100 being configured to transmit or receive RF signals in a higher frequency band (e.g., cellular high band frequencies or only a higher frequency portion of the cellular low band frequencies or only a higher frequency portion of the cellular high band frequencies). Therefore, in some aspects, when the higher frequency range antenna element 102 is decoupled from the lower frequency range antenna element 104 (e.g., via the resonance switch 114 being disengaged), and the higher frequency range coupler element 106 is capacitively or inductively coupled to the higher frequency range antenna element 102, the antenna device 100 is configured to transmit or receive RF signals through the higher frequency range antenna element 102 but not the lower frequency range antenna element 104, thereby allowing the antenna device 100 to operate within a specific higher frequency range bandwidth (e.g., frequency bandwidth for cellular high band or a higher frequency portion of cellular low band or a higher frequency portion of cellular high band).

In some aspects, the higher frequency range antenna feed 110 is disposed in proximity of the higher frequency range coupler element 106, and is configured to couple to the higher frequency range coupler element 106 (e.g., directly coupled). The higher frequency range antenna feed 110 may be configured to provide RF signals to the higher frequency range coupler element 106, for transmitting or receiving RF signals through the higher frequency range antenna element 102. In some aspects, because the higher frequency range antenna element 102, the higher frequency range coupler element 106, and the higher frequency range antenna feed 110 are configured to provide a higher frequency range switch stage, the antenna device 100 can transmit or receive RF signals within a specific higher frequency range bandwidth. For example, in the higher frequency range switch stage configuration, the antenna device 100 is configured to resonate at one or more frequencies within a specific higher frequency range bandwidth (e.g., frequency bandwidth for cellular high band or a higher frequency portion of cellular low band or a higher frequency portion of cellular high band), switch between two or more frequencies within the specific higher frequency range bandwidth, or switch between two or more frequencies within a higher frequency range bandwidth and a lower frequency range bandwidth.

Likewise, in certain aspects, the lower frequency range antenna feed 112 is disposed in proximity of the lower frequency range coupler element 108, and is configured to couple to the lower frequency range coupler element 108 (e.g., directly coupled). The lower frequency range antenna feed 112, in some aspects, may be configured to provide RF signals to the lower frequency range coupler element 108, for transmitting or receiving RF signals through the higher frequency range antenna element 102 and the lower frequency range antenna element 104, the higher frequency range antenna element 102 coupled to the lower frequency range antenna element 104 (e.g., as a single antenna element via the resonance switch 114 being engaged). In some aspects, because the higher frequency range antenna element 102 and the lower frequency range antenna element 104, the lower frequency range coupler element 108, and the lower frequency range antenna feed 112 are configured to provide a lower frequency range switch stage, the antenna device 100 can transmit or receive RF signals within a specific lower frequency range bandwidth. For example, in the lower frequency range switch stage configuration, the antenna device 100 is configured to resonate at one or more frequencies within a specific lower frequency range bandwidth (e.g., frequency bandwidth for cellular low band or a lower frequency portion of cellular low band or a lower frequency portion of cellular high band), switch between two or more frequencies within the specific lower frequency range bandwidth, or switch between two or more frequencies within a higher frequency range bandwidth and a lower frequency range bandwidth.

In some aspects, as a result of the antenna device 100 being configured to switch between the higher frequency range and the lower frequency range, the relative impedance bandwidth of the antenna device 100 is greatly improved. The antenna device 100 implementing switching techniques is further described below, with respect to FIG. 2. These resulting impedance bandwidth improvements can be useful for devices supporting communication techniques that require wide coverage of frequency bands, for example coverage of multiple non-adjacent frequency bands as in CA, or other communication techniques.

Figure 2:
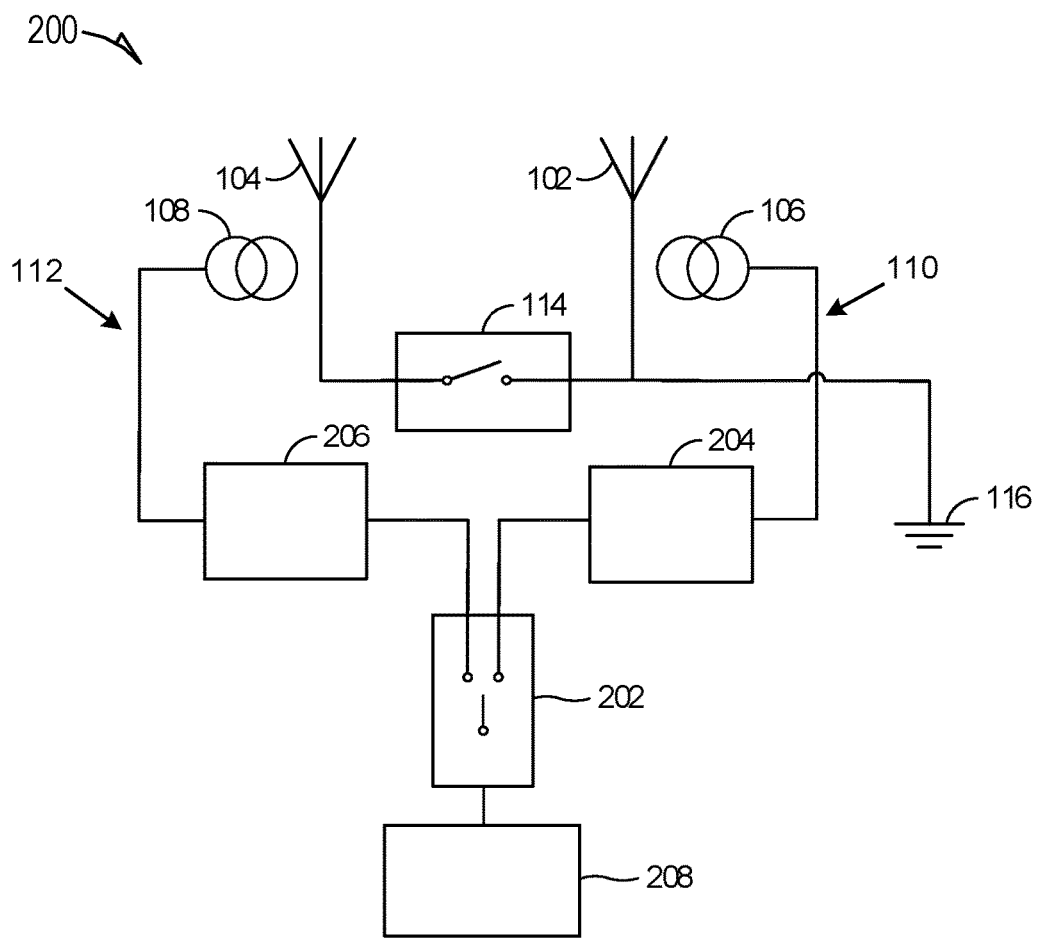
FIG. 2 illustrates a block diagram of an exemplary antenna device, according to some aspects.

FIG. 2 illustrates a block diagram of another exemplary antenna device 200, according to some aspects. Similar to FIG. 1, in some aspects, the antenna device 200 comprises a first antenna element (e.g., higher frequency range antenna element) 102, a second antenna element (e.g., lower frequency range antenna element) 104, a first coupler element (e.g., higher frequency range coupler element) 106, a second coupler element (e.g., lower frequency range coupler element) 108, a first antenna feed (e.g., higher frequency range antenna feed) 110, a second antenna feed (e.g., lower frequency range antenna feed) 112, a resonance switch 114 (e.g., SPST switch), and biasing circuitry (not shown) configured to provide a bias voltage to the resonance switch 114. The antenna device 200 may also be implemented on a surface such as a printed circuit board (PCB). In some aspects, the higher frequency range antenna element 102 is directly coupled to a ground plane 116. Alternatively, the higher frequency range antenna element 102 can be coupled to the ground plane by an inductor or capacitor to ground. Further, the antenna device 200 may be operably coupled to a transceiver 208 to receive RF signals from the transceiver 208 for transmission or to route received RF signals to the transceiver 208. In some aspects, the transceiver 208 is a separate component from antenna device 200.

Similar to FIG. 1, in some aspects, when the higher frequency range antenna element 102 is decoupled from the lower frequency range antenna element 104 (e.g., via the resonance switch 114 being disengaged), and the higher frequency range coupler element 106 is capacitively or inductively coupled to the higher frequency range antenna element 102, the antenna device 200 is configured to provide a higher frequency range switch stage and transmit or receive RF signals through primarily the higher frequency range antenna element 102 with only a small contribution from the lower frequency range antenna element 104 (depending on the $C_{off}$ capacitance of the resonance switch 114), thereby allowing the antenna device 100 to operate within a specific higher frequency range (e.g., resonate at one or more frequencies within a frequency bandwidth for cellular high band or a higher frequency portion of cellular low band or a higher frequency portion of cellular high band).

Likewise, in certain aspects similar to FIG. 1, when the higher frequency range antenna element 102 is coupled to the lower frequency range antenna element 104 (e.g., via the resonance switch 114 being engaged), and the lower frequency range coupler element 108 is capacitively or inductively coupled to the lower frequency range antenna element 104, the antenna device 200 is configured to provide a lower frequency range switch stage and transmit or receive RF signals through both the higher frequency range antenna element 102 and the lower frequency range antenna element 104 (e.g., as a single antenna element), thereby allowing the antenna device 200 to operate within a specific lower frequency range (e.g., resonate at one or more frequencies within a frequency bandwidth for cellular low band or a lower frequency portion of cellular low band or a lower frequency portion of cellular high band).

In some aspects, the antenna device 200 further comprises a signal routing switch 202, such as a SP2T switch, configured to switch RF signals between either the higher frequency range antenna element 102 or the lower frequency range antenna element 104 (e.g., by switching an RF signal between the higher frequency range coupler element 106 and the lower frequency range coupler element 108). Further, in some aspects, the antenna device 200 also comprises first antenna matching circuitry (e.g., higher frequency range antenna matching circuitry) 204 and second antenna matching circuitry (e.g., lower frequency range antenna matching circuitry) 206. The higher frequency range antenna matching circuitry 204 and the lower frequency range antenna matching circuitry 206, in some aspects, are disposed in between a signal source and the higher frequency range antenna feed 110 and the lower frequency range antenna feed 112, respectively. Specifically, in some aspects, the higher frequency range antenna matching circuitry 204 and the lower frequency range antenna matching circuitry 206 are disposed between the signal routing switch 202 and the antenna feeds 110 and 112.

Further, in certain aspects, the signal routing switch 202 can provide the higher frequency range switch stage by switching to a higher frequency range position and routing RF signals to the higher frequency range antenna element 102 (e.g., via the higher frequency range matching circuitry 204 and the higher frequency range antenna feed 110). Likewise, the signal routing switch 202 can provide the lower frequency range switch stage by switching to a lower frequency range position and routing RF signals to the lower frequency range antenna element 104 (e.g., via the lower frequency range matching circuitry 206 and the lower frequency range antenna feed 112).

As described above with respect to certain aspects, by engaging the resonance switch 114 to couple the higher frequency range antenna element 102 and the lower frequency range antenna element 104, the electrical length of the antenna device 200 is increased. In some aspects, as a result of the antenna device 200 being configured to switch between the higher frequency range and the lower frequency range, the relative impedance bandwidth of the antenna device 100 is greatly improved. These aspects are shown in more detail with respect to FIG. 3.

Figure 3A:
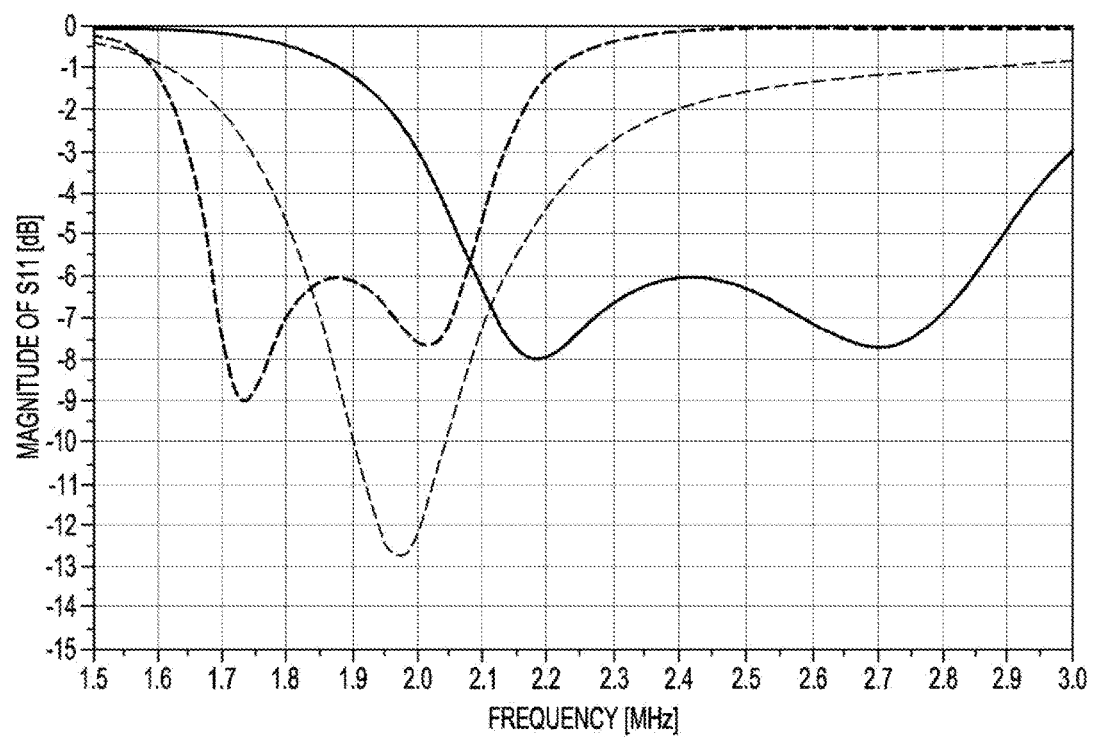
FIG. 3A illustrates exemplary S11 and complex impedance values of an antenna device as a function of frequency, according to some aspects.
Figure 3B:
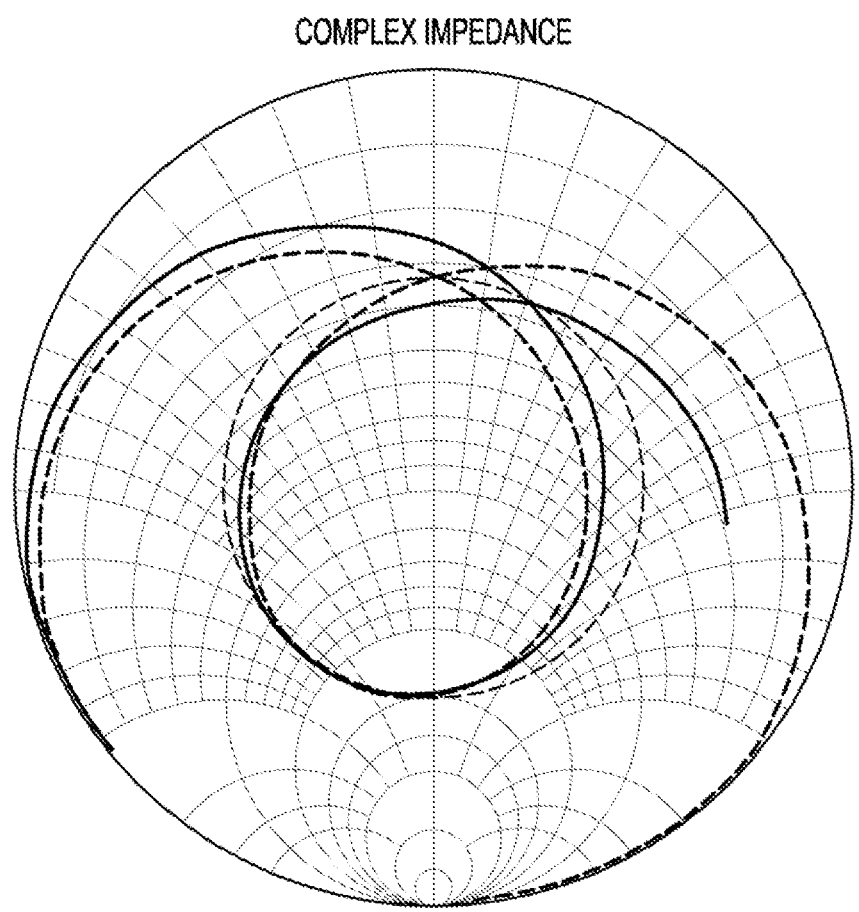
FIG. 3B illustrates exemplary complex impedance values of an antenna device, according to some aspects.

FIG. 3 illustrates exemplary S11 and complex impedance values of an antenna device (e.g., antenna devices 100, 200) as a function of frequency, according to some aspects. As can be seen from FIG. 3A the antenna device 200 is configured to provide wideband frequency coverage (e.g., in both a lower frequency range and a higher range, adjacent to each other in this example) utilizing the lower frequency range switch stage and higher frequency range switch stage configurations, respectively, as described above with respect to FIGS. 1 and 2. Further, FIG. 3A illustrates that the antenna device 200 is configured to resonate at one or more frequency ranges (e.g., two resonant frequencies) in both the lower frequency range switch stage and the higher frequency range switch stage, as compared to a typical reference monopole, shown by a dotted line in FIG. 3. These results are also shown (for the two switch stages) as a complex impedance, illustrating, for example, two curls in the Smith chart of FIG. 3B.

As seen in FIG. 3, the antenna device 200 is configured to increase available impedance bandwidth for both switch stages, as compared to a typical reference monopole, this increases available impedance bandwidth resulting in an increase in covered frequency range. Such considerations are valid when the allocated volumes for antennas in certain devices are insufficient to cover a desired frequency span. These resulting impedance bandwidth improvements can be useful for devices supporting communication techniques where wide bandwidth is important, for example coverage of multiple non-adjacent frequency bands as in CA, or other communication techniques.

Figure 4A:
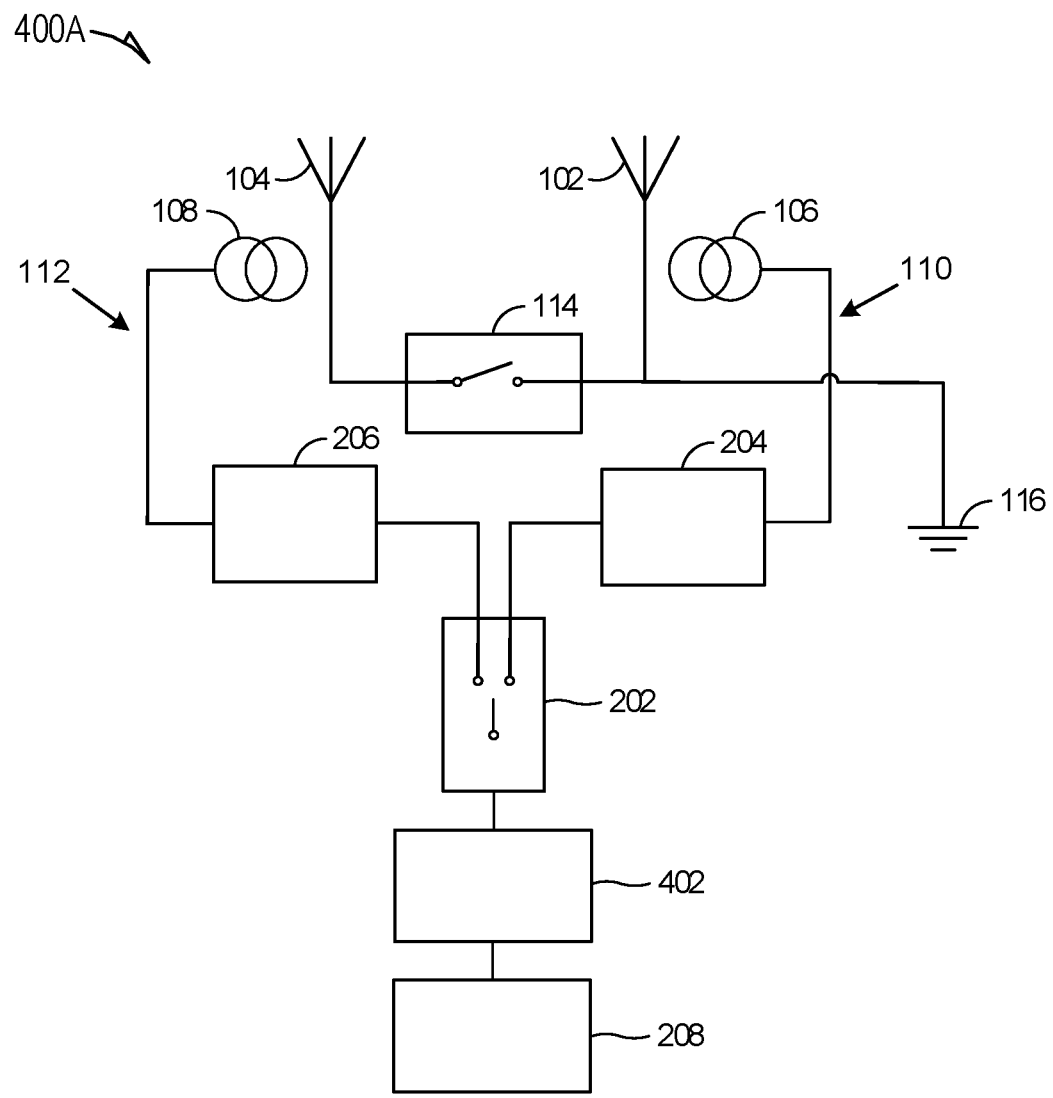
FIG. 4A illustrates a block diagram of an exemplary antenna device, according to some aspects.

FIG. 4A illustrates a block diagram of another exemplary antenna device 400A, according to some aspects. Similar to FIGS. 1 and 2, in some aspects, the antenna device 400A comprises a higher frequency range antenna element 102, a lower frequency range antenna element 104, a higher frequency range coupler element 106, a lower frequency range coupler element 108, a higher frequency range antenna feed 110, a lower frequency range antenna feed 112, a resonance switch 114, and biasing circuitry (not shown) configured to provide a bias voltage to the resonance switch 114. The antenna device 400A may be separate from and operably coupled to a transceiver 208 to receive RF signals from the transceiver 208 for transmission or to route received RF signals to the transceiver 208.

Figure 4B:
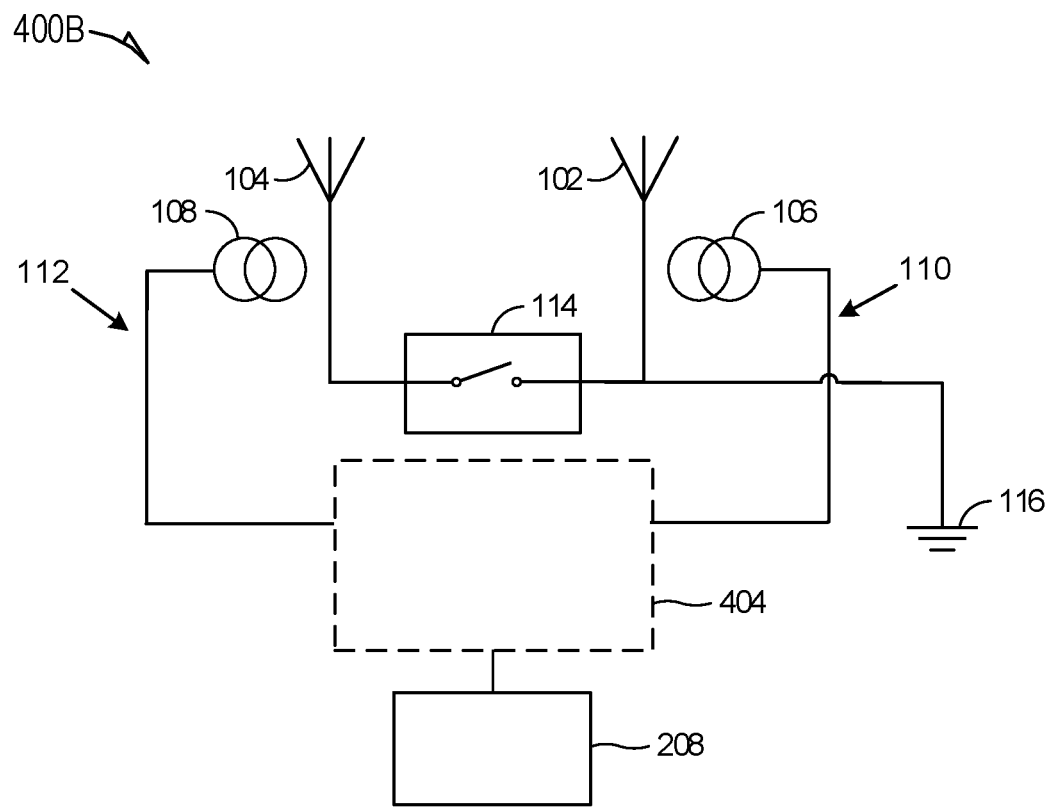
FIG. 4B illustrates a block diagram of an exemplary antenna device, according to some aspects.

The antenna device 400A, in certain aspects, further comprises an impedance tuning component 402. The impedance tuning component 402 may be implemented as an individual component, having impedance tuning circuitry and shown in one aspect as being disposed between the signal routing switch 202 and a transceiver 208. Alternatively, as shown in FIG. 4B, impedance tuning circuitry 404 may be integrated into the circuitry of the antenna device 400B. Impedance tuning circuitry 404, in some aspects, can include higher frequency range antenna matching circuitry, lower frequency range antenna matching circuitry, and a signal routing switch, similar to FIG. 4A. Further, the impedance tuning circuitry 404, in certain aspects, can be configured to adaptively tune the antenna device 400B.

In some aspects, the impedance tuning component 402 of FIG. 4A or the impedance tuning circuitry 404 of FIG. 4B can be configured to provide an impedance tuning for the higher frequency range switch stage and the lower frequency range switch stage. Specifically, in certain aspects, the higher frequency range antenna matching circuitry 204 of FIG. 4A or the impedance tuning circuitry 404 of FIG. 4B can be configured to provide impedance tuning with respect to the higher frequency range antenna element 102 by adapting an impedance, of a signal path to the higher frequency range antenna feed 110, to one or more resonant frequencies within a higher frequency range impedance bandwidth (e.g., frequency bandwidth for cellular high band or a higher frequency portion of cellular low band or a higher frequency portion of cellular high band). Likewise, in certain aspects the lower frequency antenna matching circuitry 206 of FIG. 4A or the impedance tuning circuitry 404 of FIG. 4B can be configured to provide impedance tuning with respect to the lower frequency range antenna element 104, or the lower frequency range antenna element 104 and the higher frequency range antenna element 102 as a coupled single antenna element, by adapting an impedance, of a signal path to the lower frequency range antenna feed 112, to one or more resonant frequencies within a lower frequency impedance bandwidth (e.g., frequency bandwidth for cellular low band or a lower frequency portion of cellular low band or a lower frequency portion of cellular high band).

Additionally, in some aspects, the higher frequency range antenna matching circuitry 204 can be configured to provide impedance tuning with respect to the lower frequency range antenna element 104 and the higher frequency range antenna element 102, as a coupled single antenna element, by adapting an impedance of a signal path to the higher frequency range antenna feed 110. Further, in some aspects, the lower frequency range antenna matching circuitry 206 may be configured to provide impedance tuning with respect to the lower frequency range antenna element 104, the lower frequency range antenna element 104 being decoupled from the higher frequency range antenna element 102, by adapting an impedance of a signal path to the lower frequency range antenna feed 112.

In certain aspects, the antenna device 400 is configured to separately match (e.g., separately perform impedance tuning of) certain frequency bands of operation (e.g., separately match each of a cellular high band or a low band). Specifically, in some aspects, antenna device 400 is configured to separately perform, for each of a transmit signal and receive signal, impedance tuning of the higher frequency range antenna element 102, or the lower frequency range antenna element 104 and the higher frequency range antenna element 102, as a coupled single antenna element. The antenna device 400 may perform impedance tuning by adapting an impedance of a signal path to the higher frequency range antenna feed 110 or to the lower frequency range antenna feed 112, to one or more resonant frequencies within a higher frequency range impedance bandwidth or a lower frequency range impedance bandwidth, respectively, and obtain one or more reflection coefficients that satisfy a predetermined reflection coefficient threshold value (e.g., S11 of −6 dB). In some aspects, separately performing impedance tuning for each of a transmit signal and receive signal can be applicable to half-duplex communication techniques. However, the wide impedance bandwidths as described herein, in some aspects, are also applicable to full duplex communication techniques.

Figure 5A:
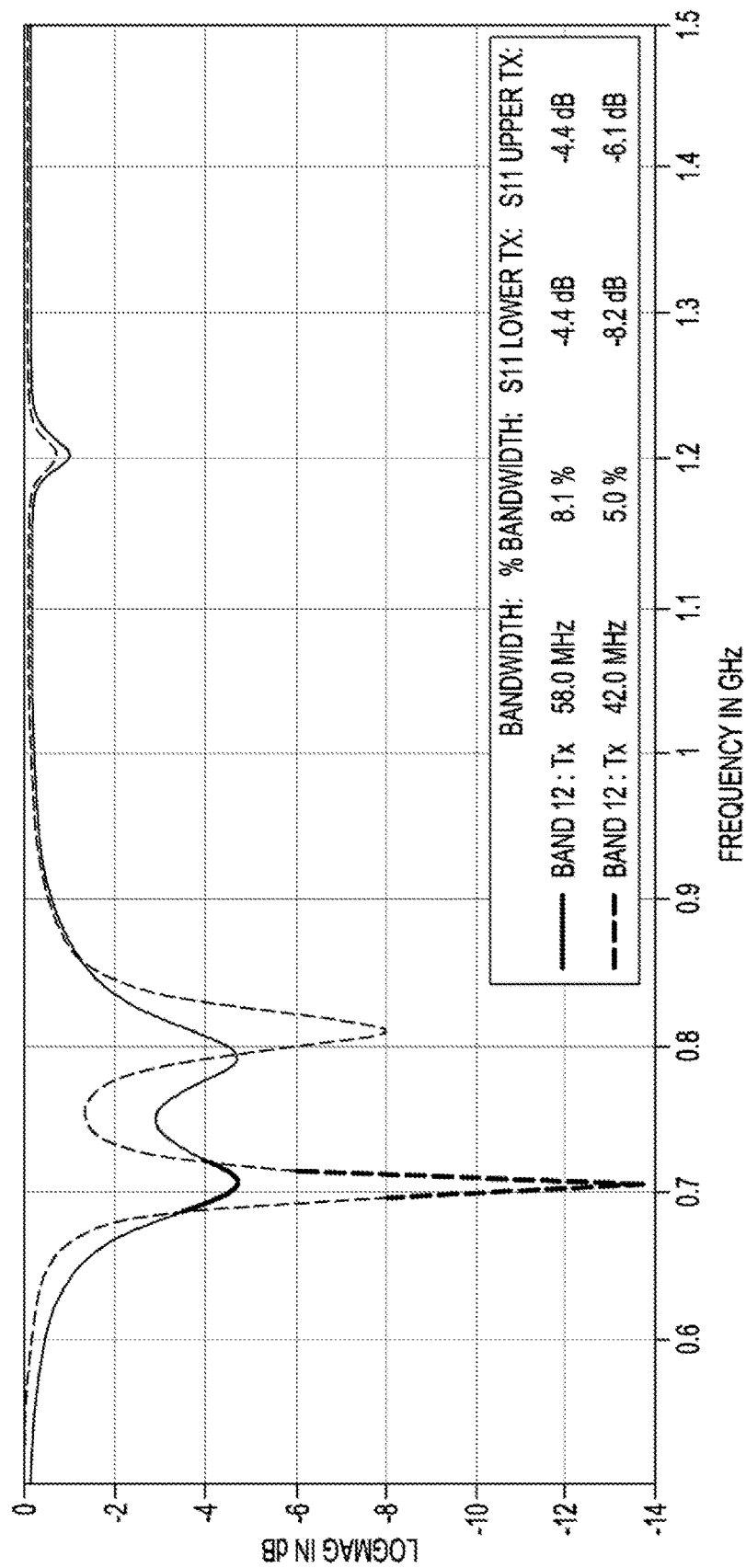
FIG. 5A illustrates impedance values of an antenna device as a function of frequency, according to some aspects.
Figure 5B:
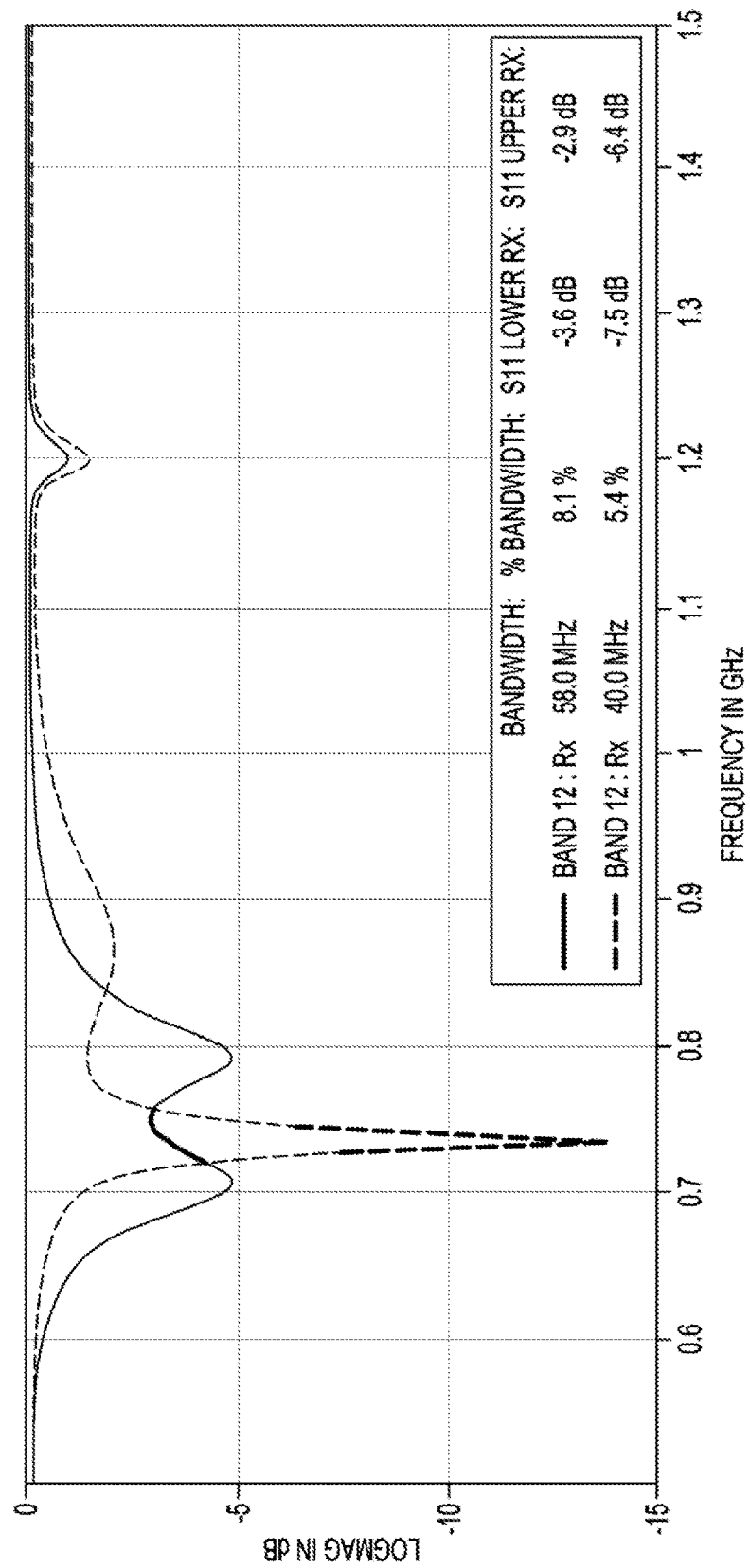
FIG. 5B illustrates impedance values of an antenna device as a function of frequency, according to some aspects.

FIG. 5 illustrates impedance values of an antenna device (e.g., antenna device 400A or 400B) as a function of frequency, according to some aspects. Separate impedance values are shown in FIG. 5A and FIG. 5B for exemplary transmit and receive frequencies. In some aspects, the Q of an antenna operating in a low frequency range (e.g., LTE low band) may be very high and it may not be possible to match impedances over a complete frequency band (e.g., duplex band) for certain frequencies in a given frequency band (e.g., LTE low band). In certain aspects, the impedance tuning component 402 or 404 can improve an impedance match for the antenna device 400 in a given communication technique (e.g., full duplex). Additionally, in some aspects, the impedance tuning component 402 or 404 can separately perform impedance tuning for each of a transmit or receive signal within a transmit or receive frequency band (e.g., Tx or Rx LTE band), for example within a half-duplex communication technique. In some aspects, the impedance tuning component 402 or 404 can separately perform impedance tuning for each of a transmit or receive signal within a high band (e.g., LTE high band) or a low band (e.g., LTE low band).

Figure 6:
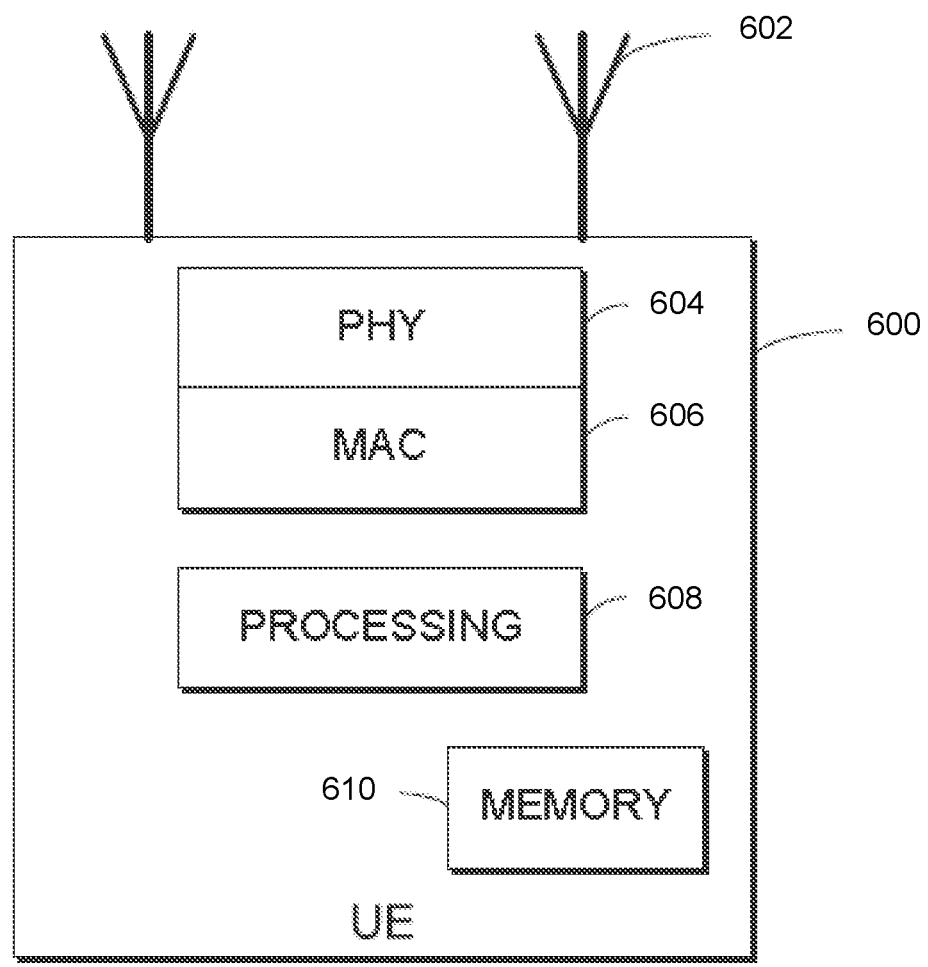
FIG. 6 illustrates a functional block diagram of user equipment (UE) according to some aspects.

FIG. 6 illustrates a functional block diagram of a communication platform with which the antenna device described herein may be used, in accordance with some aspects. In some aspects the communication platform may be UE configured to operation in a mobile communication network, such as a 3GPP LTE network, while in other aspects, the communication platform may be a communication station (STA) configured to operation in a Wi-Fi network. The aspects are not limited to 3GPP LTE networks, or Wi-Fi networks. In accordance with some aspects, the open systems interconnection media access control (MAC) circuitry 606 may be disposed to contend for a wireless medium configure frames or packets for communicating over the wireless medium and the physical layer (PHY) circuitry 604 may be disposed to transmit and receive signals. The PHY 604 may include circuitry for modulation/demodulation, upconversion/downconversion, filtering, amplification, etc. In some aspects, the processing circuitry 608 of the UE 600 may include one or more processors. In some aspects, two or more antennas may be coupled to the physical layer circuitry disposed for sending and receiving signals. The memory 610 may be configured to store information for configuring the processing circuitry 608 to perform operations for configuring and transmitting UE frames and performing the various operations described herein.

In some aspects, the communication platform 600 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or other device that may receive and/or transmit information wirelessly. In some aspects, the platform 600 may include one or more of a keyboard, a display, a non-volatile memory port, multiple antennas, a graphics processor, an application processor, speakers, and other mobile device elements. The display may be a liquid crystal display (LCD) screen including a touch screen.

The one or more antennas 602 utilized by the communication platform 600 may comprise one or more directional or omnidirectional antennas, including, for example, dipole antennas, monopole antennas, patch antennas, loop antennas, microstrip antennas or other types of antennas suitable for transmission of RF signals. In some aspects, instead of two or more antennas, a single antenna with multiple apertures may be used. In these aspects, each aperture may be considered a separate antenna. In some MIMO aspects, the antennas may be effectively separated to take advantage of spatial diversity and the different channel characteristics that may result between each of antennas and the antennas of a transmitting station. In some MIMO aspects, the antennas may be separated by up to $1/10$ of a wavelength or more.

Aspects may be implemented in one or a combination of hardware, firmware and software. Aspects may also be implemented as instructions stored on a computer-readable storage medium, which may be read and executed by at least one processor to perform the operations described herein. A computer-readable storage medium may include any non-transitory mechanism for storing information in a form readable by a machine (e.g., a computer). For example, a computer-readable storage medium may include read-only memory (ROM), random-access memory (RAM), magnetic disk storage media, optical storage media, flash-memory devices, and other storage devices and media. In these aspects, one or more processors may be configured with the instructions to perform the operations described herein.

In some aspects, the communication platform 600 may be configured to receive orthogonal frequency division multiplexing (OFDM) communication signals over a multicarrier communication channel in accordance with an orthogonal frequency division multiple access (OFDMA) communication technique. The OFDM signals may comprise a plurality of orthogonal subcarriers. In some broadband multicarrier aspects, Evolved Node Bs (eNBs) may be s may be part of a broadband wireless access (BWA) network communication network, such as a Worldwide Interoperability for Microwave Access (WiMAX) communication network or a 3rd Generation Partnership Project (3GPP) Universal Terrestrial Radio Access Network (UTRAN) Long-Term-Evolution (LTE) or a Long-Term-Evolution Advanced (LTE-A) communication network, although the scope is not limited in this respect. In these broadband multicarrier aspects, the platform 600 and the eNBs may be configured to communicate in accordance with an OFDMA technique.

Although the communication platform 600 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs), radio-frequency integrated circuits (RFICs) and combinations of various hardware and logic circuitry for performing at least the functions described herein. In some aspects, the functional elements may refer to one or more processes operating on one or more processing elements.

Figure 7:
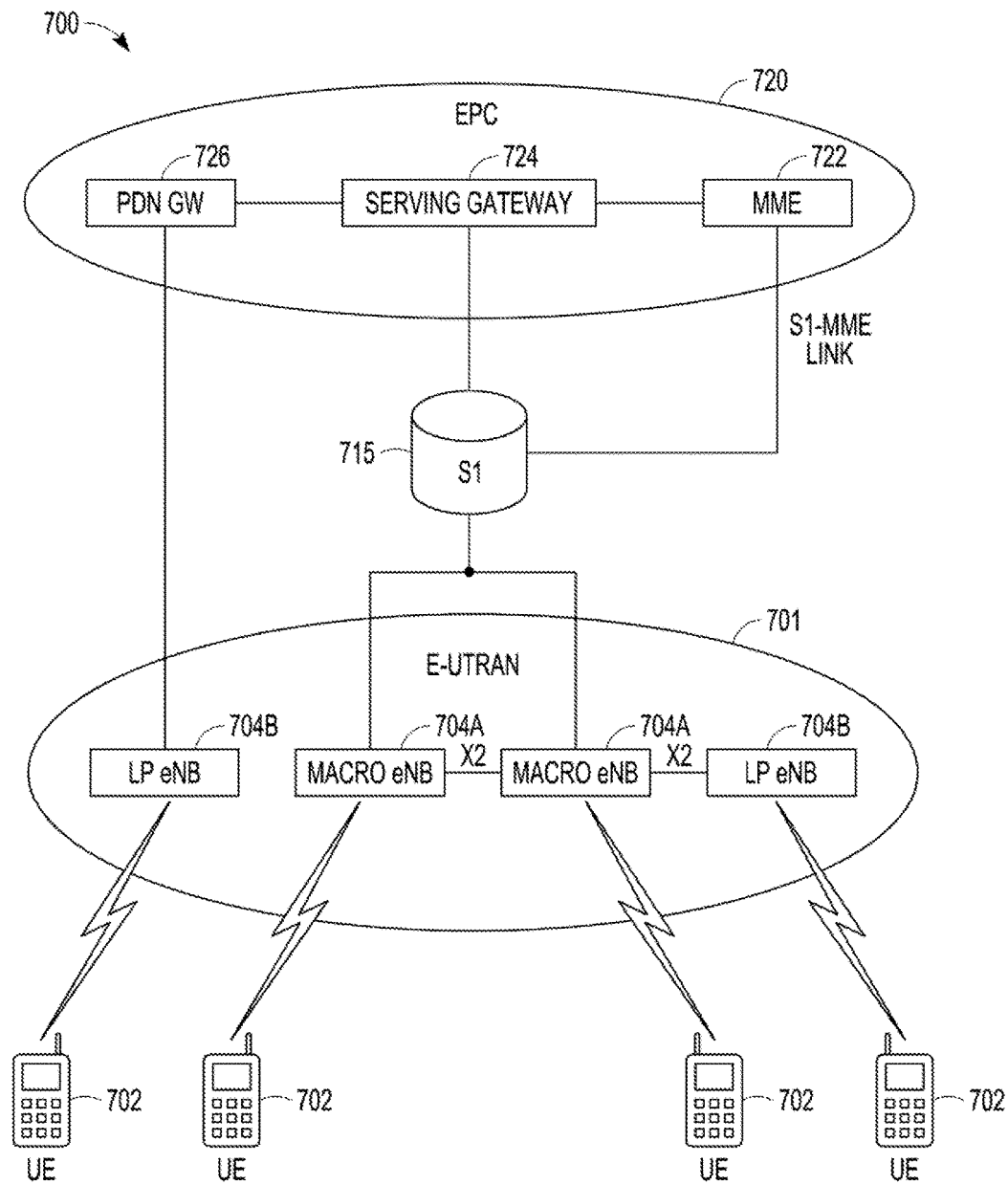
FIG. 7 illustrates a portion of an end-to-end network architecture with various components of the network in accordance with some aspects.

FIG. 7 shows a portion of an end-to-end network architecture of a network (e.g. LTE network) with various components of the network in accordance with some aspects. The network 700 comprises a radio access network (RAN) (e.g., as depicted, the E-UTRAN 701 or evolved universal terrestrial radio access network) 700 and the core network 720 (e.g., shown as an evolved packet core (EPC)) coupled together through an S1 interface 715. For convenience and brevity sake, only a portion of the core network 720, as well as the RAN 700, is shown.

The core network 720 includes mobility management entity (MME) 722, serving gateway (serving GW) 724, and packet data network gateway (PDN GW) 726. The RAN includes enhanced node B's (eNBs) 704 (which may operate as base stations) for communicating with user equipment (UE) 702. The eNBs 704 may include macro eNBs and low power (LP) eNBs.

The MME is similar in function to the control plane of legacy Serving GPRS Support Nodes (SGSN). The MME manages mobility aspects in access such as gateway selection and tracking area list management. The serving GW 724 terminates the interface toward the RAN 700, and routes data packets between the RAN 700 and the core network 720. In addition, it may be a local mobility anchor point for inter-eNB handovers and also may provide an anchor for inter-3GPP mobility. Other responsibilities may include lawful intercept, charging, and some policy enforcement. The serving GW 724 and the MME 722 may be implemented in one physical node or separate physical nodes. The PDN GW 726 terminates an SGi interface toward the packet data network (PDN). The PDN GW 726 routes data packets between the EPC 720 and the external PDN, and may be a key node for policy enforcement and charging data collection. It may also provide an anchor point for mobility with non-LTE accesses. The external PDN can be any kind of IP network, as well as an IP Multimedia Subsystem (IMS) domain. The PDN GW 726 and the serving GW 724 may be implemented in one physical node or separated physical nodes.

The eNBs 704 (macro and micro) terminate the air interface protocol and may be the first point of contact for a UE 702. In some aspects, an eNB 704 may fulfill various logical functions for the RAN 700 including but not limited to RNC (radio network controller functions) such as radio bearer management, uplink and downlink dynamic radio resource management and data packet scheduling, and mobility management. In accordance with aspects, UEs 702 may be configured to communicate OFDM communication signals with an eNB 704 over a multicarrier communication channel in accordance with an OFDMA communication technique. The OFDM signals may comprise a plurality of orthogonal subcarriers.

The S1 interface 715 is the interface that separates the RAN 700 and the EPC 720. It is split into two parts: the S1-U, which carries traffic data between the eNBs 704 and the serving GW 724, and the S1-MME, which is a signaling interface between the eNBs 704 and the MME 722. The X2 interface is the interface between eNBs 704. The X2 interface comprises two parts, the X2-C and X2-U. The X2-C is the control plane interface between the eNBs 704, while the X2-U is the user plane interface between the eNBs 704.

With cellular networks, LP cells are typically used to extend coverage to indoor areas where outdoor signals do not reach well, or to add network capacity in areas with very dense phone usage, such as train stations. As used herein, the term low power (LP) eNB refers to any suitable relatively low power eNB for implementing a narrower cell (narrower than a macro cell) such as a femtocell, a picocell, or a micro cell. Femtocell eNBs are typically provided by a mobile network operator to its residential or enterprise customers. A femtocell is typically the size of a residential gateway or smaller, and generally connects to the user's broadband line. Once plugged in, the femtocell connects to the mobile operator's mobile network and provides extra coverage in a range of typically 30 to 50 meters for residential femtocells. Thus, a LP eNB might be a femtocell eNB since it is coupled through the PDN GW 726. Similarly, a picocell is a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality. Thus, LP eNB may be implemented with a picocell eNB since it is coupled to a macro eNB via an X2 interface. Picocell eNBs or other LP eNBs may incorporate some or all functionality of a macro eNB. In some cases, this may be referred to as an access point base station or enterprise femtocell.

In some aspects, a downlink resource grid may be used for downlink transmissions from an eNB to a UE. The grid may be a time-frequency grid, called a resource grid, which is the physical resource in the downlink in each slot. Such a time-frequency plane representation is a common practice for OFDM systems, which makes it intuitive for radio resource allocation. Each column and each row of the resource grid correspond to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements and in the frequency domain, this represents the smallest quanta of resources that currently can be allocated. There are several different physical downlink channels that are conveyed using such resource blocks. With particular relevance to this disclosure, two of these physical downlink channels are the physical downlink shared channel and the physical down link control channel.

The physical downlink shared channel (PDSCH) carries user data and higher-layer signaling to a UE 702 of FIG. 7. The physical downlink control channel (PDCCH) carries information about the transport format and resource allocations related to the PDSCH channel, among other things. It also informs the UE about the transport format, resource allocation, and H-ARQ information related to the uplink shared channel. Typically, downlink scheduling (assigning control and shared channel resource blocks to UEs within a cell) is performed at the eNB based on channel quality information fed back from the UEs to the eNB, and then the downlink resource assignment information is sent to a UE on the control channel (PDCCH) used for (assigned to) the UE.

The PDCCH uses CCEs (control channel elements) to convey the control information. Before being mapped to resource elements, the PDCCH complex-valued symbols are first organized into quadruplets, which are then permuted using a sub-block inter-leaver for rate matching. Each PDCCH is transmitted using one or more of these control channel elements (CCEs), where each CCE corresponds to nine sets of four physical resource elements known as resource element groups (REGs). Four QPSK symbols are mapped to each REG. The PDCCH can be transmitted using one or more CCEs, depending on the size of DCI and the channel condition. There may be four or more different PDCCH formats defined in LTE with different numbers of CCEs (e.g., aggregation level, L,=1, 2, 4, or 8).

EXAMPLES AND ADDITIONAL NOTES

Although an aspect has been described with reference to specific example aspects, it will be evident that various modifications and changes may be made to these aspects without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

Such aspects of the inventive subject matter may be referred to herein, individually and/or collectively, by the term "aspect" merely for convenience and without intending to voluntarily limit the scope of this application to any single aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects, and other aspects not specifically described herein, will be apparent to those of skill in the art upon reviewing the above description.

The above detailed description includes references to the accompanying drawings, which form a part of the detailed description. The drawings show, by way of illustration, specific aspects which can be practiced. These aspects are also referred to herein as "examples." All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other aspects can be used, such as by one of ordinary skill in the art upon reviewing the above description. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope should be determined with reference to the appended claims, along with the full scope of equivalents to which such claims are entitled.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

A first example provides an antenna device comprising a first antenna coupled to a ground plane; a second antenna, disposed in the proximity of the first antenna, configured to couple to the first antenna; a first switch, disposed in between the first antenna and the second antenna, configured to modify an electrical length of the antenna device by coupling the first antenna to the second antenna; a first coupler disposed in proximity of the first antenna, configured to couple to a first antenna feed and capacitively or inductively couple to the first antenna; and a second coupler disposed in proximity of the second antenna, configured to couple to a second antenna feed and configured to capacitively or inductively couple to the second antenna.

A second example provides the antenna device according to the first example, wherein the first coupler is configured to transmit or receive radio frequency (RF) signals through the first antenna; and the second coupler is configured to transmit or receive RF signals through the first antenna and the second antenna, wherein the first antenna is coupled to the second antenna.

A third example provides the antenna device according to the first example, wherein the antenna device is configured to resonate at one or more frequencies within a first impedance bandwidth and resonate at one or more frequencies within a second impedance bandwidth.

A fourth example provides the antenna device according to the third example, wherein the first switch is configured to couple the first antenna to the second antenna; and decouple the first antenna from the second antenna.

A fifth example provides the antenna device according to the first example, further comprising a second switch, operably coupled to the first antenna feed and operably coupled to the second antenna feed, configured to provide a signal path to the first antenna feed and to the second antenna feed.

A sixth example provides the antenna device according to the fourth example, further comprising an impedance tuning component configured to tune an impedance of the antenna device.

A seventh example provides the antenna device according to the sixth example, wherein the impedance tuning component comprises first antenna matching circuitry, configured to tune an impedance of the first antenna by adapting an impedance, of a signal path to the first antenna feed, to the one or more resonant frequencies within the first impedance bandwidth and obtain one or more reflection coefficients that satisfy a predetermined reflection coefficient threshold value; and second antenna matching circuitry, configured to tune an impedance of the second and first antenna, the second antenna coupled to the first antenna, wherein the impedance tuning includes adapting an impedance, of a signal path to the second antenna feed, to the one or more resonant frequencies within the second impedance bandwidth, and obtain one or more reflection coefficients that satisfy a predetermined reflection coefficient threshold value.

A eighth example provides the antenna device according to the fourth example, further comprising bias circuitry configured to provide bias voltage to the first switch for coupling the first antenna to the second antenna or decoupling the first antenna from the second antenna.

A ninth example provides the antenna device according to the seventh example, wherein the impedance tuning component is further configured to separately tune, for each of a transmit signal and a receive signal, an impedance of the first antenna, or the second antenna coupled to first antenna, by adapting an impedance of a signal path to the first antenna feed or to the second antenna feed, to the one or more resonant frequencies within the first impedance bandwidth or the one or more resonant frequencies within the second impedance bandwidth, and obtain one or more reflection coefficients that satisfy a predetermined reflection coefficient threshold value.

A tenth example provides the antenna device according to the ninth example, wherein the antenna device is configured to operate in a half-duplex communication scheme or a full-duplex communication scheme to receive and transmit RF signals.

An eleventh example provides the antenna device according to the fourth example, wherein the antenna device is configured to support carrier aggregation.

A twelfth example provides the antenna device according to the first example, wherein the first switch is a single pole single throw (SPST) switch.

A thirteenth example provides the antenna device according to the fifth example, wherein the second switch is a single pole double throw (SPDT) switch.

A fourteenth example provides the antenna device according to the fifth example, wherein the second switch is integrated into circuitry of the antenna device.

A fifteenth example provides the antenna device according to the seventh example, wherein the circuitry of the impedance tuning component are integrated into circuitry of the antenna device.

A sixteenth example provides the antenna device according to the first example, further comprising one or more additional antennas and one or more additional switches, the one or more additional switches each being configured to couple an additional antenna to the first antenna and the second antenna; and one or more additional couplers disposed in proximity of the one or more additional antennas, each additional coupler configured to couple to an additional antenna feed and capacitively or inductively couple to one of the additional antennas for transmitting or receiving RF signals without causing an increase in a volume of the antenna device.

A seventeenth example provides a wireless communication device comprising at least one radio comprising signal processing circuitry; and an antenna component, the antenna component comprising a first antenna, coupled to a ground plane, and a second antenna, disposed in the proximity of the first antenna and configured to couple to the first antenna, the first antenna and the second antenna operably coupled to the signal processing circuitry to send and receive radio frequency (RF) signals; a first switch, disposed in between the first antenna and the second antenna, configured to modify an electrical length of the antenna component by coupling the first antenna to the second antenna; a first coupler disposed in proximity of the first antenna, configured to couple to a first antenna feed and capacitively or inductively couple to the first antenna; and a second coupler disposed in proximity of the second antenna, configured to couple to a second antenna feed and capacitively or inductively couple to the second antenna.

A eighteenth example provides a wireless communication device according to the seventeenth example, wherein the first coupler is configured to transmit or receive radio frequency (RF) signals through the first antenna; and the second coupler is configured to transmit or receive RF signals through the first antenna and the second antenna, wherein the first antenna is coupled to the second antenna.

A nineteenth example provides a wireless communication device according to the seventeenth example, wherein the antenna component is configured to resonate at one or more frequencies within a first impedance bandwidth and resonate at one or more frequencies within a second impedance bandwidth, and wherein the first switch is configured to couple the first antenna to the second antenna and decouple the first antenna from the second antenna.

A twentieth example provides a wireless communication device according to the seventeenth example, further comprising a second switch, operably coupled to the first antenna feed and operably coupled to the second antenna feed, configured to provide a signal path to the first antenna feed and to the second antenna feed.

A twenty-first example provides a wireless communication device according to the eighteenth example, further comprising an impedance tuning component configured to tune an impedance of the antenna component, wherein the impedance tuning component comprises first antenna matching circuitry, configured to tune an impedance of the first antenna by adapting an impedance, of a signal path to the first antenna feed, to the one or more resonant frequencies within the first impedance bandwidth and obtain one or more reflection coefficients that satisfy a predetermined reflection coefficient threshold value; and second antenna matching circuitry, configured to tune an impedance of the second and first antenna, the second antenna coupled to first antenna, wherein the impedance tuning includes adapting an impedance, of a signal path to the second antenna feed, to the one or more resonant frequencies within the second impedance bandwidth, and obtain one or more reflection coefficients that satisfy a predetermined reflection coefficient threshold value.

A twenty-second example provides a wireless communication device according to the eighteenth example, further comprising bias circuitry configured to provide bias voltage to the first switch for coupling the first antenna to the second antenna or decoupling the first antenna from the second antenna.

A twenty-third example provides a wireless communication device according to the twentieth example, wherein the impedance tuning component is further configured to separately tune, for each of a transmit signal and a receive signal, an impedance of the first antenna, or the second antenna coupled to first antenna, by adapting an impedance of a signal path to the first antenna feed or to the second antenna feed, to the one or more resonant frequencies within the first impedance bandwidth or the one or more resonant frequencies within the second impedance bandwidth, and obtain one or more reflection coefficients that satisfy a predetermined reflection coefficient threshold value.

A twenty-fourth example provides a wireless communication device according to the twenty-second example, wherein the antenna component is configured to operate in a half-duplex communication scheme or a full-duplex communication scheme to receive and transmit RF signals.

A twenty-fifth example provides a wireless communication device according to the eighteenth example, wherein the antenna component is configured to support carrier aggregation.

A twenty-sixth example provides a wireless communication device according to the seventeenth example, wherein the first switch is a single pole single throw (SPST) switch.

A twenty-seventh example provides a wireless communication device according to the nineteenth example, wherein the second switch is a single pole double throw (SPDT) switch.

A twenty-eighth example provides a wireless communication device according to the nineteenth example, wherein the second switch is integrated into circuitry of the antenna component.

A twenty-ninth example provides a wireless communication device according to the twentieth example, wherein the first and second antenna matching circuitry of the impedance tuning component are integrated into circuitry of the antenna component.

A thirtieth example provides a wireless communication device according to the seventeenth example, wherein the antenna component further comprises one or more additional antennas and one or more additional switches, the one or more additional switches each being configured to couple an additional antenna to the first antenna and the second antenna; and one or more additional couplers disposed in proximity of the one or more additional antennas, each additional coupler configured to couple to an additional antenna feed and capacitively or inductively couple to one of the additional antennas for transmitting or receiving RF signals without causing an increase in a volume of the antenna device.

A thirty-first example provides a method of tuning an antenna device that is configured to include a first antenna coupled to a ground plane and a second antenna disposed in the proximity of the first antenna; a first switch, disposed in between the first antenna and the second antenna; a first coupler disposed in proximity of the first antenna and coupled to a first antenna feed; and a second coupler disposed in proximity of the second antenna and coupled to a second antenna feed, the method comprising switching from a lower frequency range to a higher frequency range, or from the higher frequency range to the lower frequency range, wherein the lower frequency range includes the first switch coupling the first antenna to the second antenna and the higher frequency range includes the first switch decoupling the first antenna from the second antenna, and wherein the higher frequency range includes the antenna device being configured to resonate at one or more frequencies within a first impedance bandwidth and wherein the lower frequency range includes the antenna device being configured to resonate at one or more frequencies within a second impedance bandwidth.

A thirty-second example provides a method of tuning an antenna device according to the thirty-first example, further comprising adapting, during an operation of the higher frequency range, an impedance of a signal path to the first antenna feed, to the one or more resonant frequencies within the first impedance bandwidth and obtaining one or more reflection coefficients that satisfy a predetermined reflection coefficient threshold value.

A thirty-third example provides a method of tuning an antenna device according to the thirty-first example, adapting, during an operation of the lower frequency range, an impedance of a signal path to the second antenna feed, to the one or more resonant frequencies within the second impedance bandwidth and obtaining one or more reflection coefficients that satisfy a predetermined reflection coefficient threshold value.

A thirty-fourth example provides a method of tuning an antenna device according to the thirty-first example, wherein each of the coupling of the first antenna to the second antenna and the decoupling of the first antenna from the second antenna includes providing a bias voltage to the first switch.

A thirty-fifth example provides a method of tuning an antenna device according to the thirty-first example, further comprising separately adapting, for each of a transmit signal and a receive signal, during an operation of the higher frequency range, an impedance of a signal path to the first antenna feed, to the one or more resonant frequencies within the first impedance bandwidth and obtain one or more reflection coefficients that satisfy a predetermined reflection coefficient threshold value.

A thirty-sixth example provides a method of tuning an antenna device according to the thirty-first example, separately adapting, for each of a transmit signal and a receive signal, during an operation of the lower frequency range, an impedance of a signal path to the second antenna feed, to the one or more resonant frequencies within the second impedance bandwidth and obtain one or more reflection coefficients that satisfy a predetermined reflection coefficient threshold value.

What is claimed is:

1. An antenna device comprising:
    a first antenna coupled to a ground plane;
    a second antenna, disposed in the proximity of the first antenna, configured to couple to the first antenna;
    a first switch, disposed in between the first antenna and the second antenna, configured to modify an electrical length of the antenna device by coupling the first antenna to the second antenna;
    a first coupler disposed in proximity of the first antenna, configured to couple to a first antenna feed and capacitively or inductively couple to the first antenna;
    a second coupler disposed in proximity of the second antenna, configured to couple to a second antenna feed and configured to capacitively or inductively couple to the second antenna; and
    a second switch, operably coupled to the first antenna feed and operably coupled to the second antenna feed, configured to provide a signal path to the first antenna feed and to the second antenna feed.

2. The antenna device of claim 1, wherein the first coupler is configured to transmit or receive radio frequency (RF) signals through the first antenna; and
    the second coupler is configured to transmit or receive RF signals through the first antenna and the second antenna, wherein the first antenna is coupled to the second antenna.

3. The antenna device of claim 1, wherein the antenna device is configured to resonate at one or more frequencies within a first impedance bandwidth and resonate at one or more frequencies within a second impedance bandwidth.

4. The antenna device of claim 1, wherein the first switch is configured to:
    couple the first antenna to the second antenna; and
    decouple the first antenna from the second antenna.

5. The antenna device of claim 4, further comprising an impedance tuning component configured to tune an impedance of the antenna device.

6. The antenna device of claim 5, wherein the impedance tuning component comprises:
    first antenna matching circuitry, configured to tune an impedance of the first antenna by adapting an impedance, of a signal path to the first antenna feed, to the one or more resonant frequencies within the first impedance bandwidth and obtain one or more reflection coefficients that satisfy a predetermined reflection coefficient threshold value; and second antenna matching circuitry, configured to tune an impedance of the second and first antenna, the second antenna coupled to the first antenna, wherein the impedance tuning includes adapting an impedance, of a signal path to the second antenna feed, to the one or more resonant frequencies within the second impedance bandwidth, and obtain one or more reflection coefficients that satisfy a predetermined reflection coefficient threshold value.

7. The antenna device of claim 6, wherein the impedance tuning component is further configured to:

separately tune, for each of a transmit signal and a receive signal, an impedance of the first antenna, or the second antenna coupled to first antenna, by adapting an impedance of a signal path to the first antenna feed or to the second antenna feed, to the one or more resonant frequencies within the first impedance bandwidth or the one or more resonant frequencies within the second impedance bandwidth, and obtain one or more reflection coefficients that satisfy a predetermined reflection coefficient threshold value.

8. The antenna device of claim 7, wherein the antenna device is configured to operate in a half-duplex communication scheme or a full-duplex communication scheme to receive and transmit RF signals.

9. The antenna device of claim 6, wherein the circuitry of the impedance tuning component are integrated into circuitry of the antenna device.

10. The antenna device of claim 4, further comprising bias circuitry configured to provide bias voltage to the first switch for coupling the first antenna to the second antenna or decoupling the first antenna from the second antenna.

11. The antenna device of claim 4, wherein the antenna device is configured to support carrier aggregation.

12. The antenna device of claim 1, wherein the first switch is a single pole single throw (SPST) switch.

13. The antenna device of claim 1, wherein the second switch is a single pole double throw (SPDT) switch.

14. The antenna device of claim 1, wherein the second switch is integrated into circuitry of the antenna device.

15. The antenna device of claim 1, further comprising:

one or more additional antennas and one or more additional switches, the one or more additional switches each being configured to couple an additional antenna to the first antenna and the second antenna; and one or more additional couplers disposed in proximity of the one or more additional antennas, each additional coupler configured to couple to an additional antenna feed and capacitively or inductively couple to one of the additional antennas for transmitting or receiving RF signals without causing an increase in a volume of the antenna device.

16. A wireless communication device comprising:

at least one radio comprising signal processing circuitry; and an antenna component, the antenna component comprising:

a first antenna, coupled to a ground plane, and a second antenna, disposed in the proximity, of the first antenna and configured to couple to the first antenna, the first antenna and the second antenna operably coupled to the signal processing circuitry to send and receive radio frequency (RF) signals;

a first switch, disposed in between the first antenna and the second antenna, configured to modify an electrical length of the antenna component by coupling the first antenna to the second antenna;

a first coupler disposed in proximity of the first antenna, configured to couple to a first antenna feed and capacitively or inductively couple to the first antenna;

a second coupler disposed in proximity of the second antenna, configured to couple to a second antenna feed and capacitively or inductively couple to the second antenna; and a second switch, operably coupled to the first antenna feed and operably coupled to the second antenna feed, configured to provide a signal path to the first antenna feed and to the second antenna feed.

17. The wireless communication device of claim 16, wherein the first coupler is configured to transmit or receive radio frequency (RF) signals through the first antenna; and the second coupler is configured to transmit or receive RF signals through the first antenna and the second antenna, wherein the first antenna is coupled to the second antenna.

18. The wireless communication device of claim 17, further comprising an impedance tuning component configured to tune an impedance of the antenna component, wherein the impedance tuning component comprises:

first antenna matching circuitry, configured to tune an impedance of the first antenna by adapting an impedance, of a signal path to the first antenna feed, to the one or more resonant frequencies within the first impedance bandwidth and obtain one or more reflection coefficients that satisfy a predetermined reflection coefficient threshold value; and second antenna matching circuitry, configured to tune an impedance of the second and first antenna, the second antenna coupled to first antenna, wherein the impedance tuning includes adapting an impedance, of a signal path to the second antenna feed, to the one or more resonant frequencies within the second impedance bandwidth, and obtain one or more reflection coefficients that satisfy a predetermined reflection coefficient threshold value.

19. The wireless communication device of claim 17, further comprising bias circuitry configured to provide bias voltage to the first switch for coupling the first antenna to the second antenna or decoupling the first antenna from the second antenna.

20. The wireless communication device of claim 19, wherein the antenna component is configured to operate in a half-duplex communication scheme or a full-duplex communication scheme to receive and transmit RF signals.

21. The wireless communication device of claim 17, wherein the antenna component is configured to support carrier aggregation.

22. The wireless communication device of claim 16, wherein the antenna component is configured to resonate at one or more frequencies within a first impedance bandwidth and resonate at one or more frequencies within a second impedance bandwidth, and wherein the first switch is configured to couple the first antenna to the second antenna and decouple the first antenna from the second antenna.

23. The wireless communication device of claim 16, wherein the impedance tuning component is further configured to:

separately tune, for each of a transmit signal and a receive signal, an impedance of the first antenna, or the second antenna coupled to first antenna, by adapting an impedance of a signal path to the first antenna feed or to the second antenna feed, to the one or more resonant frequencies within the first impedance bandwidth or the one or more resonant frequencies within the second impedance bandwidth, and obtain one or more reflection coefficients that satisfy a predetermined reflection coefficient threshold value.

24. The wireless communication device of claim 16, wherein the first switch is a single pole single throw (SPST) switch.

25. The wireless communication device of claim 16, wherein the second switch is a single pole double throw (SPDT) switch.

26. The wireless communication device of claim 16, wherein the second switch is integrated into circuitry of the antenna component.

27. The wireless communication device of claim 16, wherein the first and second antenna matching circuitry of the impedance tuning component are integrated into circuitry of the antenna component.

28. The wireless communication device of claim 16, wherein the antenna component further comprises:
   one or more additional antennas and one or more additional switches, the one or more additional switches each being configured to couple an additional antenna to the first antenna and the second antenna; and
   one or more additional couplers disposed in proximity of the one or more additional antennas, each additional coupler configured to couple to an additional antenna feed and capacitively or inductively couple to one of the additional antennas for transmitting or receiving RF signals without causing an increase in a volume of the antenna device.

29. A method of tuning an antenna device that is configured to include:
   a first antenna coupled to a ground plane and a second antenna disposed in the proximity of the first antenna;
   a first switch, disposed in between the first antenna and the second antenna;
   a first coupler disposed in proximity of the first antenna and coupled to a first antenna feed; and
   a second coupler disposed in proximity of the second antenna and coupled to a second antenna feed; and
   a second switch, operably coupled to the first antenna feed and operably coupled to the second antenna feed, configured to provide a signal path to the first antenna feed and to the second antenna feed, the method comprising:

switching from a lower frequency range to a higher frequency range, or from the higher frequency range to the lower frequency range, wherein the lower frequency range includes the first switch coupling the first antenna to the second antenna and the higher frequency range includes the first switch decoupling the first antenna from the second antenna, and
wherein the higher frequency range includes the antenna device being configured to resonate at one or more frequencies within a first impedance bandwidth and wherein the lower frequency range includes the antenna device being configured to resonate at one or more frequencies within a second impedance bandwidth.

30. The method of claim 29, further comprising:
adapting, during an operation of the higher frequency range, an impedance of a signal path to the first antenna feed, to the one or more resonant frequencies within the first impedance bandwidth and obtaining one or more reflection coefficients that satisfy a predetermined reflection coefficient threshold value.

31. The method of claim 29, further comprising:
adapting, during an operation of the lower frequency range, an impedance of a signal path to the second antenna feed, to the one or more resonant frequencies within the second impedance bandwidth and obtaining one or more reflection coefficients that satisfy a predetermined reflection coefficient threshold value.

32. The method of claim 29, wherein each of the coupling of the first antenna to the second antenna and the decoupling of the first antenna from the second antenna includes providing a bias voltage to the first switch.

33. The method of claim 29, further comprising:
separately adapting, for each of a transmit signal and a receive signal, during an operation of the higher frequency range, an impedance of a signal path to the first antenna feed, to the one or more resonant frequencies within the first impedance bandwidth and obtain one or more reflection coefficients that satisfy a predetermined reflection coefficient threshold value.

34. The method of claim 29, further comprising:
separately adapting, for each of a transmit signal and a receive signal, during an operation of the lower frequency range, an impedance of a signal path to the second antenna feed, to the one or more resonant frequencies within the second impedance bandwidth and obtain one or more reflection coefficients that satisfy a predetermined reflection coefficient threshold value.

* * * * *

UNITED STATES PATENT AND TRADEMARK OFFICE
CERTIFICATE OF CORRECTION

PATENT NO. : 10,312,594 B2
APPLICATION NO. : 15/474199
DATED : June 4, 2019
INVENTOR(S) : Svendsen et al.

Page 1 of 1

It is certified that error appears in the above-identified patent and that said Letters Patent is hereby corrected as shown below:

In the Claims

In Column 19, Line 63, in Claim 16, delete "proximity," and insert --proximity-- therefor Signed and Sealed this
Twenty-first Day of April, 2020

Andrei Iancu
*Director of the United States Patent and Trademark Office*